3,231,395
PROCESS FOR PREPARING FROZEN MUSHROOMS
Kenneth E. Duggan, Croton-on-Hudson, and Charles H. Byrne, Pearl River, N.Y., assignors to General Foods Corporation, White Plains, N.Y., a corporation of Delaware
No Drawing. Filed Jan. 31, 1964, Ser. No. 341,737
5 Claims. (Cl. 99—193)

The present application is a continuation-in-part of Serial No. 167,414 filed January 19, 1962, and now abandoned.

This invention relates to frozen mushrooms, and particularly to a frozen mushroom which retains a creamy light color and fresh flavor even after extended storage periods and to the process for producing such a product.

It has long been recognized that mushrooms are extremely delicate with respect to color, flavor and texture. Normal processing procedures often result in a final product unlike the fresh product in flavor and color characteristics. Although most vegetable and other food products have been packaged in a frozen state for many years, the commercial use of frozen mushrooms has been severely limited due to difficulties in processing the mushrooms in a manner such that the color and flavor characteristic are retained. For this reason, a large portion of the mushrooms produced are sold in the natural state which severely limits the storageability and transportability of the product. The commercial production of canned mushrooms has been carried on for many years; however, these mushrooms do not exhibit the color and flavor characteristic of fresh mushrooms.

Conventional frozen food processes, wherein the product is blanched in hot water or steam to completely eliminate any enzymatic activity, then cooled, drained, and frozen have proven less than satisfactory in obtaining a product which would retain the fresh flavor of mushrooms, and the resultant product tends to be extremely bland and flavorless and has a grayish color. It has been found that if blanching is carried out under conditions which result in the incomplete arresting of the enzymatic activity in the mushrooms, the flavor of the mushroom will be retained to a greater extent. Advantageously, in such a process, the partially blanched mushroom will then be subjected to a sulfur dioxide treatment so as to inhibit discoloration, thereby striking a balance between the complete destruction of enzyme activity resulting in a bland flavorless product and uncontrolled enzymatic activity resulting in complete discoloration of the product to a dark brown almost black tone.

It has been found, however, that the above described procedure causes a graying of the mushroom when compared to natural mushrooms, which reduces the acceptability of the product for sale on the consumer market. It has been found unexpectedly that where such a partial blanch and subsequent sulfur dioxide treatment are supplemented by the addition of an edible carboxylic acid such as citric, tartaric, malic, acetic, and the like, in relatively small amounts, such discoloration of the mushrooms is prevented, and a creamy white product is obtained which has a natural mushroom flavor.

It is an object of this invention to produce a frozen mushroom product which is characterized by its light color, fresh flavor and superior storage characteristics under normal frozen food storage conditions.

Other objects and advantages of this invention will be apparent from the detailed description herein below.

According to this invention, fresh mushrooms which have previously been washed and pre-treated so as to inhibit the enzymatic activity thereof, as by a pre-treatment with sulfur dioxide, are subjected to hot water or steam for a period of time such that the enzymatic activity within the mushrooms is only partially arrested. The mushrooms are then treated with a small amount of edible carboxylic acid and with sulfur dioxide, after which they are frozen. This product may be either packed before freezing or loose frozen and then packed. Since mushrooms are extremely delicate and develop discoloration on washing and subsequent handling, the pre-treatment with sulfur dioxide is preferred to provide a limited degree of protection, thereby permitting handling and also providing sufficient time for normal cutting and trimming procedures after washing.

In the preferred embodiment of the process of this invention, the fresh mushrooms are first cut, trimmed and washed in any conventional manner. The washing is preferably carried out by the use of a water spray so as not to damage the surface of the mushrooms which might occur in an agitated bath operation. The washed mushrooms are then preferably dipped in an aqueous solution containing 200–900 p.p.m. sulfur dioxide, typically 400 p.p.m.; 2–10% sodium chloride or other salt, typically 6.0% and 0.25%–2.5% citric acid or other edible carboxylic acid, typically 0.5%. The sulfur dioxide may be introduced into the solution in any convenient manner as by the addition of alkali salts of sulfurous acid, either partially or fully neutralized, such as sodium bisulfite and sodium sulfite or of molecularly dehydrated pyrosulfites and metabisulfites such as sodium metabisulfite and potassium metabisulfite. Other procedures, such as the direct use of gaseous sulfur dioxide, for the introduction of sulfur dioxide will readily occur to those skilled-in-the-art. The mushrooms are soaked in this solution for a period of 1 to 2 minutes after which they are subjected to an incomplete blanch in either hot water at 165° to 212° F. or steam, preferably steam, for a period of 1 to 4 minutes, typically 2½ minutes; in the case of water blanching, it is preferred to operate for as brief a period of time as possible, say 1 to 2 minutes, at about 212° F. The partially blanched mushrooms are then cooled and dipped in an aqueous solution containing salt, an edible carboxylic acid, and sulfur dioxide in proportions similar to the proportions described above with respect to the first dipping step for a period of from 1 to 2 minutes. The mushrooms are then washed with water, as by spraying, for 1 to 2 minutes and allowed to drain. The treated and drained mushrooms are frozen either in loose form or after introduction into the final package.

The product produced according to the above process has a superior creamy color similar to the color of the original fresh mushrooms and a characteristic mushroom flavor. These qualities are retained even if the product is allowed to stand for six hours at room temperature, and the product exhibits superior storage characteristics under normal frozen food storage conditions. The weight loss of the final mushroom product in the frozen form, as compared to the weight of the original mushroom, is extremely low, on the order of 5%–15%.

The problem involved with the handling and treatment of mushrooms prior to freezing requires that a delicate balance be maintained so as to prevent the formation of off-colors, either grayish on the one hand or reddish-brown to dark brown on the other hand, without, at the same time, producing a cooked product having a rubbery texture or a flavor unlike cooked fresh mushrooms. In order to help prevent browning and to enhance the storage properties of the mushrooms, it has been recognized that blanching with steam or hot water is desirable. However, if such blanching is carried out to a degree sufficient to completely inactivate the enzymes in the mushrooms, say for a period of about 8 to 9 minutes, the resultant product will be extremely bland and will have retained little, if any, of the characteristic mushroom flavor. This blandness problem can be reduced to a satisfactory extent by subjecting the mushrooms to a partial or incomplete blanch, i.e. treatment with steam or hot water for a period of time such as to produce incomplete enzymatic inactivation. However, this procedure again raises problems with respect to the development of a brownish off-color in the mushroom during storage, which can be substantially prevented by treatment with sulfur dioxide. Again the solution to one problem raises a new problem in that the sulfur dioxide treatment produces a grayish cast to the mushrooms, which is also undesirable. It has been unexpectedly found that this grayish cast can be substantially eliminated by additional treatment of the mushrooms with an edible carboxylic acid, such as citric acid. Thus, the color problem can be satisfactorily solved only in accordance with the composite procedure of this invention which includes partial blanching, sulfur dioxide treatment, and treatment with an edible carboxylic acid. By this process, it is possible to obtain a frozen mushroom product which is creamy white in the frozen state and which turns a desirable golden brown when it is sauteed.

It has also been found that the addition of a salt, preferably sodium chloride, to the treating solution tends to enhance the flavor of the cooked product and improve its texture. Although it is within the scope of this invention to treat mushrooms in the manner described above without any pre-treatment with sulfur dioxide or an edible carboxylic acid prior to the partial blanch, it is preferred that such a pre-treatment be utilized since it arrests the enzymatic activity in the mushrooms sufficiently to permit sorting, trimming and cutting of the mushrooms prior to the partial blanch. Such sorting, trimming and cutting may be carried out after the partial blanch, although such a sequence is not preferred since the mushrooms develop a slippery outer surface during blanching, thereby making them much more difficult to handle.

This invention will be more readily understood by reference to the following specific examples:

*Example I*

A quantity of "cut-bed run" mushrooms, i.e. fresh picked mushrooms with the roots removed, were placed on a stainless steel mesh belt which passed under overhead cold water sprays which washed the mushrooms to remove the residual soil. The washed mushrooms were then placed in a porous stainless steel wash basket which was submerged for a period of 2 minutes in an aqueous solution containing 4.4% sodium chloride, 0.75% citric acid and 400 p.p.m. $SO_2$. The basket containing the pretreated mushrooms was then carried by a moving belt through a steam blancher where it was subjected to jetted steam for a period of 2½ minutes. The basket is then carried under cold water sprays to cool the mushrooms and then is submerged for a period of 2 minutes in an aqueous solution containing 4.4% sodium chloride, 0.75% citric acid, and 400 p.p.m. sulfur dioxide. The basket was then passed under cold water sprays for a period of about 1 to 2 minutes to wash the mushrooms which were then allowed to drain for about 15 minutes. The pretreated and drained mushrooms were packaged, overwrapped and plate frozen for approximately 3 hours. After being allowed to stand for 6 hours at room temperature, the mushrooms were similar to fresh mushrooms with regard to color and they exhibited extremely good storage characteristics without the development of any discoloration or off-flavor when maintained under conventional frozen food storage conditions. Upon cooking, the mushrooms had a desirable golden-brown color, non-rubbery texture and distinctive flavor similar to cooked fresh mushrooms. The unfrozen mushrooms weighed approximately 90% of the weight of the original "cut-bed run" mushrooms.

*Example II*

A quantity of "cut-bed run" mushrooms, i.e. fresh picked mushrooms with the roots removed, were placed on a stainless steel mesh belt which passed under overhead cold water sprays which washed the mushrooms to remove the residual soil. The washed mushrooms were then placed in a porous stainless steel wash basket which was submerged for a period of 2 minutes in an aqueous solution containing 4.4% sodium chloride, 0.75% citric acid and 400 p.p.m. $SO_2$. The basket containing the pretreated mushrooms was then carried by a moving belt through a hot water blancher where it was subjected to hot water at 212° F. for a period of 2½ minutes. The basket is then carried under cold water sprays to cool the mushrooms and then is submerged for a period of 2 minutes in an aqueous solution containing 4.4% sodium chloride, 0.75% citric acid, and 400 p.p.m. sulfur dioxide. The basket was then passed under cold water sprays for a period of about 1 to 2 minutes to wash the mushrooms which were then allowed to drain for about 15 minutes. The pre-treated and drained mushrooms were packaged, overwrapped and plate frozen for approximately 3 hours. After being allowed to stand for 6 hours at room temperature, the mushrooms were similar to fresh mushrooms with regard to color and they exhibited extremely good storage characteristics without the development of any discoloration or off-flavor when maintained under conventional frozen food storage conditions. Upon cooking, the mushrooms had a desirable golden-brown color, non-rubbery texture and distinctive flavor similar to cooked fresh mushrooms. The unfrozen mushrooms weighed approximately 90% of the weight of the original "cut-bed run" mushrooms.

Although this invention has been described with reference to the specific examples hereinbefore set forth, it will be obvious to those skilled-in-the-art that various modifications may be made thereto which come within the scope of this invention.

What is claimed is:

1. A process for preparing frozen mushrooms, comprising partially blanching fresh mushrooms by subjecting them to treatment in a hot aqueous medium selected from the group consisting of hot water and steam for a period of 1 to 4 minutes, immersing the partially blanched mushrooms in an aqueous solution containing about 0.25 to 2.5% edible carboxylic acid and 200 to 900 p.p.m. sulfur dioxide for about 1 to 2 minutes, and then freezing the mushrooms.

2. A process for preparing frozen mushrooms, comprising partially blanching fresh mushrooms by subjecting them to treatment in a hot aqueous medium selected from the group consisting of hot water and steam for a period of 1 to 4 minutes, immersing the partially blanched mushrooms in an aqueous solution containing about 0.25 to 2.5% citric acid, 200 to 900 p.p.m. sulfur dioxide and 2 to 10% sodium chloride for about 1 to 2 minutes, and then freezing the mushrooms.

3. A process for preparing frozen mushrooms, comprising immersing fresh mushrooms in an aqueous solution containing about 0.25 to 2.5% citric acid, partially blanching the mushrooms by subjecting them to treatment in a hot aqueous medium selected from the group consisting of hot water and steam for a period of 1 to 4 minutes, immersing the partially blanched mushrooms in an aqueous solution containing about 0.25 to 2.5% edible carboxylic acid and 200 to 900 p.p.m. sulfur dioxide for about 1 to 2 minutes, and then freezing the mushrooms.

4. A process for preparing frozen mushrooms, comprising immersing fresh mushrooms in an aqueous solution containing about 0.25 to 2.5% citric acid and 200 to 900 p.p.m. sulfur dioxide for about 1 to 2 minutes, partially blanching the mushrooms by subjecting them to treatment in a hot aqueous medium selected from the group consisting of hot water and steam for a period of 1 to 4 minutes, immersing the partially blanched mushrooms in an aqueous solution containing about 0.25 to 2.5% citric acid and 200 to 900 p.p.m. sulfur dioxide for about 1 to 2 minutes, and then freezing the mushrooms.

5. A process for preparing frozen mushrooms, comprising immersing fresh mushrooms in an aqueous solution containing about 0.25 to 2.5% citric acid, 200 to 900 p.p.m. sulfur dioxide and 2 to 10% sodium chloride for about 1 to 2 minutes, partially blanching the mushrooms by subjecting them to treatment in a hot aqueous medium selected from the group consisting of hot water and steam for a period of 1 to 4 minutes, immersing the partially blanched mushrooms in an aqueous solution containing about 0.25 to 2.5% edible carboxylic acid, 200 to 900 p.p.m. sulfur dioxide and 2 to 10% sodium chloride for about 1 to 2 minutes, and then freezing the mushrooms.

References Cited by the Examiner
UNITED STATES PATENTS 2,475,838   7/1949   Johnson _____ 99—193 X

OTHER REFERENCES

Agriculture Handbook No. 2, U.S.D.A., entitled "Procedures for Home Freezing of Vegetables, Fruits and Prepared Foods," September 1950, pp. 15 and 16.

A. LOUIS MONACELL, *Primary Examiner.*